United States Patent [19]

Hedman et al.

[11] Patent Number: 5,646,628
[45] Date of Patent: Jul. 8, 1997

[54] METHOD OF TREATING PERIODIC SIGNALS

[75] Inventors: Olle Anders Gustav Hedman, Alingsås; Bo Gustaf Granstam, Kållered, both of Sweden

[73] Assignee: Telefonaktiebolaget LM Ericsson, Stockholm, Sweden

[21] Appl. No.: 569,597

[22] Filed: Dec. 8, 1995

[30] Foreign Application Priority Data

Dec. 9, 1994 [SE] Sweden .................................. 9404278

[51] Int. Cl.$^6$ ..................................................... G01S 7/28
[52] U.S. Cl. ........................................ 342/195; 342/189
[58] Field of Search ............................... 342/195, 91, 93, 342/94, 95, 189

[56] References Cited

U.S. PATENT DOCUMENTS

| | | |
|---|---|---|
| 4,098,191 | 7/1978 | Bagwell et al. ................... 102/3.16 X |
| 4,106,019 | 8/1978 | Alexander et al. . |
| 4,244,029 | 1/1981 | Hogan et al. ........................... 364/728 |
| 4,267,580 | 5/1981 | Bond et al. ............................ 364/824 |
| 4,293,856 | 10/1981 | Chressanthis et al. . |
| 4,334,223 | 6/1982 | Katagi ....................................... 342/26 |
| 4,414,641 | 11/1983 | Jarrett ..................................... 364/728 |
| 4,566,010 | 1/1986 | Collins ................................ 342/379 X |
| 4,598,293 | 7/1986 | Wong .................................. 367/101 X |
| 4,649,394 | 3/1987 | Minker et al. ............................ 342/94 |
| 4,679,210 | 7/1987 | Rathi .................................. 342/145 X |
| 5,218,562 | 6/1993 | Basehore et al. .................. 364/728.03 |
| 5,426,665 | 6/1995 | Cleverly et al. ........................ 375/200 |

FOREIGN PATENT DOCUMENTS 2134392  1/1972  Germany .

*Primary Examiner*—John B. Sotomayor
*Attorney, Agent, or Firm*—Burns, Doane, Swecker & Mathis, L.L.P.

[57] ABSTRACT

The position of a periodic signal is determined in a number of steps. First, values that are related to the periodic signal are accumulated over a number of periods in a buffer. Then, an area with the lowest accumulated values in the buffer is detected for determining a zero position. A median position is determined with respect to the zero position, and the position of the periodic signal is calculated using this determined median position.

14 Claims, 1 Drawing Sheet

METHOD OF TREATING PERIODIC SIGNALS

BACKGROUND OF THE INVENTION

The present invention relates to a method for the determination of the time position of a periodically recurring signal.

Within, for example, the technical fields of communication and radar there often arises a need to determine the time position of a periodically recurring signal with a noise or interference contribution. The periodic signal is, for example, a radar scan of 360°, see FIG. 1, where in a certain direction Ω there is a target echo (10) and in other directions there are interference echoes (11). In such cases it is highly desirable to be able to determine the direction of the target echo (10) in spite of the influence of interferences (11).

In a communication signal the item searched for can be a periodically recurring synchronization word.

Mobile telephony is an area among many where it is possible to find communication signals of different sorts. To be able to use different transfer media in the complete transfer chain within mobile telephony to their full capacity, time multiplexed signals are frequently used. This is because the transfer capacity of a transfer medium often exceeds the amount of data that a single mobile telephone can generate or receive. Time multiplexing requires that a transmitter and a receiver are synchronized so that a mobile telephone does not transmit into or receive from someone else's time slot as this would lead to unsurmountable problems. To synchronize a transmitter and a receiver, synchronization words are frequently used that reappear with a certain periodicity that depends upon the specific application. Synchronization words can consist of anything from single bits or pulses via symbols to larger synchronization words with a plurality of symbols.

During normal conditions a transmitter and a receiver are fairly synchronized and only a simple tracking function is needed, for example in the form of a tracking window that finds the exact position of the synchronization words to thus ensure that the complete transfer chain is synchronized. During certain conditions it is possible to lose the synchronization to such a degree that a tracking window no longer manages to find the position of the synchronization words. In such a situation reflections of the signal may appear, which worsens the possibilities even further of being able to find the correct synchronization word. The synchronization in the transfer chain gets lost and a transfer of information becomes completely impossible in such cases. Such situations can happen, for example, when a change of base stations is effectuated, i.e. a transfer from a base station where synchronization exists to another base station.

Normally, it is possible to find the time position of the signal by creating a window around the area where the signal is expected. However, in a radar it is not known where the signal can be expected and in a communication signal it is difficult when the synchronizing words are lost, i.e. when the synchronization is lost.

One way to separate targets from interferences in a radar is described in the U.S. Pat. No. 4,649,394. This patent describes a method that determines different, suitable thresholds by creating different average values of signals in the region of the target to thus be able to separate targets from interferences. This method does not describe how to determine the time position of arbitrary cyclic functions, nor does the method seem to be suitable in any other area than radar.

SUMMARY

One object of the invention is thus to provide a method which in a simple way solves the problem of time position determination of an arbitrary periodic signal/function without the need to execute complex arithmetic operations.

A further object of the invention is to provide a method with which within the area of communication it is possible to determine, in a simple manner, the position of synchronizing words in a periodic signal to thus recover the synchronization between a transmitter and a receiver to be able to transfer information in a reliable manner.

Another object of the invention is to provide a method with which it is possible to be independent of determination and use of different threshold values.

These objects are achieved by means of a method according to the invention by storing values in a buffer. These values can either be formed by signal values/detections that have been subjected to a threshold from, for example, a radar receiver or detections from, for example, a correlator. The size of the buffer corresponds to a period of the sought signal. A zero position is defined in the buffer at a place with low/few or no signal values/detections. Departing from this zero position a median position is determined in the buffer with respect to the signal values/detections in the buffer. This median position forms a position from which the time position of the signal is determined with a greater probability. This is done with the aid of a weighted mean value formation around the median position, where the weighted mean value forms a shift from the median position.

BRIEF DESCRIPTION OF THE DRAWINGS

The invention shall be described in greater detail in the following with reference made to the attached drawings, in an explanatory and not in any way restrictive purpose, where.

DETAILED DESCRIPTION

The invention provides a method for determining the position of a periodically recurring signal with a signal strength where the position determination is executed in a plurality of steps. First, the values that are related to the periodic signal are combined during a plurality of periods in a buffer. Thereafter, an area with the lowest combined values in the buffer is detected for the determination of a zero position. A median position is determined with reference to the zero position and thereafter the position of the periodic signal is determined with the aid of the determined median position.

Figure 1:
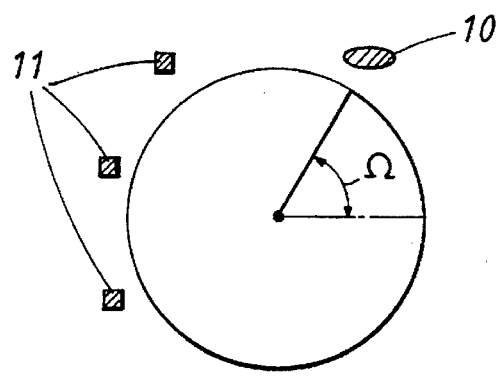
FIG. 1 illustrates a radar sweep of 360°.

To clarify the method according to the invention, a plurality of examples of its application shall be described in the following with reference to FIGS. 1 to 3.

A first example shows how the position determination of synchronization words in a mobile telephony example is done according to the method according to the invention. This is accomplished by the use of a buffer. This buffer has a size that corresponds to a period of the periodic signal with the synchronization words, and comprises a plurality of cells, where the number of cells determines the position resolution. The results from a correlator are combined in these cells during a plurality of periods. This correlator, for example, performs a bit by bit correlation of the received signal, which comprises the synchronization words, with a reference synchronization word. It is, for example, possible to only take the time position that the correlator indicates as the highest probability for the position of the synchronization word and combine this indication/detection at a corresponding place in the buffer.

After a number of periods of combining, a zero position in the buffer is defined at a place/time position with no or few combinings/detections. With reference from this zero position a median position is determined in the buffer with the aid of all values/detections in the buffer. That is, a position where the sum of all the values/detections in the cells from the defined zero position to the position is equal to the sum of the values/detections in the remaining cells. This median position is, under certain conditions, located within an area that the synchronization words appear within.

To be able to determine a position that has a higher probability to be exact, and to later be able to track the synchronization words, a correction from the median position is determined. This correction is determined as a weighted mean value of the signal values/detections in the cells around the determined median position.

The subsequent tracking of the time position of synchronization words in the periodic signal is not included in the present invention.

A second example describes how target data in a radar system can be localized with the method according to the invention. Usually, electrical periodically recurring signals are obtained from a radar receiver, just like from a correlator. These originate from, for example, a radar sweep of 360°, see FIG. 1, where in a certain direction there is a target echo (10) whose position is to be determined. The signals could just as well be optical or of some other kind. Signals in a radar station are in most cases subjected to a threshold, i.e. only signals whose signal strength exceeds a certain level are accepted. As the signal is periodic a number of periods are integrated/combined in a buffer with a size that corresponds to a period, to achieve a better signal to noise ratio. The result of the integration/combining can be illustrated by FIG. 2, which shows an example of the contents of the buffer (21) with the sought-for signal (22) after integration/combining, where the Y-axis represents combined/integrated signal amplitude. Every position in the buffer (21) corresponds to the available resolution and can in a radar application correspond to angular elements or distance elements and in the communication case also time elements.

Figure 2:
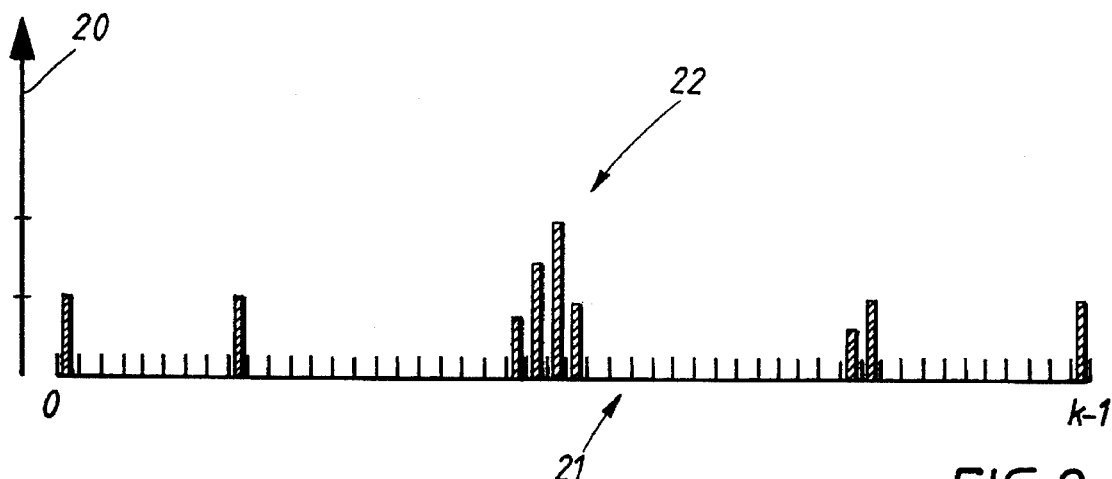
FIG. 2 illustrates a memory buffer comprising k cells with a combined/integrated signal amplitude.

In FIG. 2 the buffer (21) comprises k positions/cells, which corresponds to the period of the signal. Usually, the buffer is a so-called circular buffer or a linked list that, for example, is arranged according to positions. The values in the buffer can be integers and can, for example, be seen as a number of threshold crossings (detections) at a certain position during a certain integration time. It is of course possible to make the buffer in many different ways; it can, for example, be digital or analog or a mixture of analog and digital. The latter can as an example be made with the help of a CCD (Charge Coupled Device) memory. The design of the buffer partly depends on the type of signals that are to be treated and partly on available and commercially marketed technology. If the buffer is of a completely digital type, then all integrations can of course be realized as summations. This facilitates the necessary calculations that have to be performed and these can, in such cases, be performed with the assistance of simple digital circuit solutions. The conventional synchronizing methods are often difficult to realize with simple digital hardware. In a more flexible system these calculations can be performed with the assistance of computer technology, for example in the form of a digital signal processor that suitably uses linked lists to save the values that represent the periodic signal.

Figure 3:
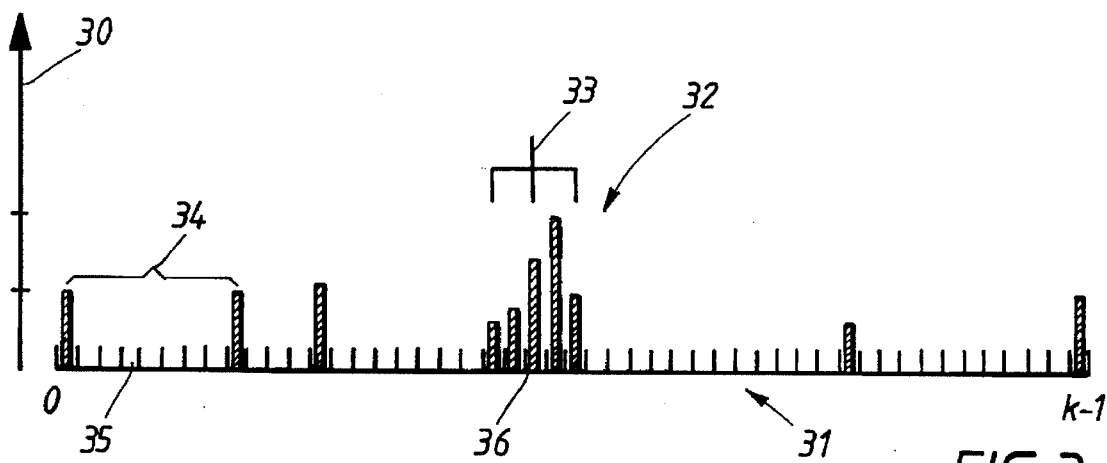
FIG. 3 illustrates a memory buffer according to the invention.

Assuming that the integrated/combined signal values/ detections are in the cells of the buffer, the method then comprises the following steps with reference to FIG. 3 where the Y-axis (30) represents combined/integrated signal amplitude in the memory buffer (31):

In a first step, an area (34) that is not located within the extension/spread area of the desired signal is searched for. This is an area with few or no signal values/detections. Somewhere within this area a zero position (35) is defined. This operation solves the problem that can arise if the desired signal (32) is located around the 0 and/or the (k-1) position in the buffer, which gives high signal values (many detections) in both ends of the memory buffer. This could influence the second step in a negative way.

In a second step, the median position (36) is determined with reference to the defined zero position, i.e. the median position is the position forward in the buffer where the running summation of the signal values/detections in the buffer is equal to half the total sum of all the signal values/detections in the buffer. If the previous step, that defines the zero position (35), did not exist, then problems could arise if the desired signal (32) was located around the ends of the memory buffer. This would then result in high signal values (many detections) in both ends. This could in such cases influence this step to determine the median position as somewhere in the middle of the buffer. In a radar application, where the length of the buffer can correspond to a 360° sweep, this implies an error of up to 180°.

In a third and last step, the accuracy is improved by means of a weighted average value formation with regard to the median position (36) being performed in, for example, an area that corresponds to the expected spread (33) of the signal. This value forms a displacement/shift to the median position (36) whereby the time position of the useful signal can be determined more accurately by adding this shift to the median position. The shift can be both positive and negative. This shift can, for example, be determined in the following manner:

$$SHIFT = \frac{\sum_{i=-\frac{k}{2}}^{\frac{k}{2}} V_{m+i} \times i}{\sum_{j=1}^{\frac{k}{2}} V_{m-j} + \sum_{l=1}^{\frac{k}{2}} V_{m+l}}$$

Where:
k=is the expected spread of the signal in number of cells
$V_i$=combined signal values in the i:th position in the buffer
m=position of the median location in the buffer i,j,l= summation variables This basic method works when the desired useful signal gives rise to at least half of the combined signal values/ detections within the complete buffer. If this is not the case then the median position (36) in the second step can end up outside the spread area of the desired signal. This results in the following step not giving the correct solution.

A further development of the inventive idea is to let the total sum of the signal values/detections in the buffer be divided by N where N=2, 3, 4, ... n, i.e. an integer larger than 1, in the second stage. At, for example, N=3 two positions in the buffer are given as candidates to the position of the useful signal. From these two, the position where the result of a summation/integration of the signal values/ detections around the respective position within an area that corresponds to the expected spread area of the signal is the greatest, is chosen.

This extended method requires that the desired useful signal gives rise to the single largest combined value of the combined signal values/detections.

In the described embodiment, digitalized and time discrete signals are used, but naturally also time continuous analog signals can be processed. In such cases it is of course necessary to use corresponding analog calculation methods.

The invention is not restricted to the above described embodiments, but can be varied within the scope of the appended claims.

What is claimed is:

1. A method for determining a time position of a periodic signal comprising the following steps:

combining values that are related to a signal strength of the periodic signal during a plurality of periods in a buffer;

detecting an area with the lowest combined values in said buffer;

determining a zero position in said detected area in said buffer;

determining a median position in said buffer with the combined values starting from said determined zero position in said buffer; and determining the time position of the periodic signal using said determined median position.

2. The method according to claim 1, wherein said buffer comprises a circular buffer with a size that corresponds to a period of said periodic signal.

3. The method according to claim 2, wherein the median position is determined as the position where an integral of said combined values from the determined zero position is equal to half an integral of all the combined values in said buffer.

4. The method according to claim 2, wherein the step of determining the median position includes:

first determining N−1 positions, where N is an integer larger than 2, and an integral of said combined values from said determined zero position to these N−1 positions is equal to multiples of an Nth part of an integral of said combined values of said buffer; and choosing among these N−1 positions, a position around which the integral of said combined values, within an area that corresponds to an expected spread of the signal, is largest.

5. Method according to claim 3, wherein the step of determining the position of the periodic signal includes:

adding a shift to said median position, wherein this shift is determined as a weighted mean value with respect to said median position and is effected on said combined values in an area that corresponds to the expected spread of the signal around said median position.

6. Method according to claim 4, wherein the step of determining the position of the periodic signal includes:

adding a shift to said median position, wherein this shift is determined as a weighted mean value with respect to said median position and is effected on said combined values in an area that corresponds to the expected spread of the signal around said median position.

7. The method according to claim 1, wherein said buffer comprises a plurality of discrete positions.

8. The method according to claim 7, wherein the step of combining the values that are related to the periodic signal is done in every position in said buffer as a summation of a number of detections that are in a corresponding position over a plurality of periods of the periodic signal, and a detection exists in a position in a period if said value that is related to the periodic signal in the corresponding position exceeds a certain threshold value.

9. The method according to claim 3, wherein the step of combining the values that are related to the periodic signal is done in every position in said buffer as a summation of a number of detections that are in a corresponding position over a plurality of periods of the periodic signal, and a detection exists in a position in a period if said value that is related to the periodic signal in the corresponding position exceeds a certain threshold value, and said integrals are determined as summations of said combined values.

10. The method according to claim 4, wherein the step of combining the values that are related to the periodic signal is done in every position in said buffer as a summation of a number of detections that are in a corresponding position over a plurality of periods of the periodic signal, and a detection exists in a position in a period if said value that is related to the periodic signal in the corresponding position exceeds a certain threshold value, and said integrals are determined as summations of said combined values.

11. The method according to claim 1, wherein the periodic signal is a target echo that originates from a radar sweep.

12. The method according to claim 1, wherein the periodic signal is a periodic synchronization word in a communication signal.

13. The method according to claim 12, wherein the values that are combined originate from a correlator that correlates the periodic synchronization word with a reference synchronization word.

14. The method according to claim 13, wherein the values that originate from the correlator indicate how good the correlation is.

* * * * *